(12) United States Patent
Teradaira et al.

(10) Patent No.: US 8,559,046 B2
(45) Date of Patent: Oct. 15, 2013

(54) PROCESSING OF COMMANDS IN AN IMAGING DEVICE

(71) Applicant: Seiko Epson Corporation, Tokyo (JP)

(72) Inventors: Mitsuaki Teradaira, Nagano-ken (JP); Masahiro Minowa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/751,933

(22) Filed: Jan. 28, 2013

(65) Prior Publication Data

US 2013/0141745 A1  Jun. 6, 2013

Related U.S. Application Data

(60) Continuation of application No. 13/463,337, filed on May 3, 2012, now Pat. No. 8,390,835, which is a continuation of application No. 13/402,300, filed on Feb. 22, 2012, now Pat. No. 8,345,274, which is a continuation of application No. 13/166,656, filed on Jun. 22, 2011, now Pat. No. 8,144,357, which is a continuation of application No. 12/892,507, filed on Sep. 28, 2010, now Pat. No. 7,995,226, which is a division of application No. 11/955,289, filed on Dec. 12, 2007, now Pat. No. 7,826,075, which is a continuation of application No. 11/064,895, filed on Feb. 24, 2005, now Pat. No. 7,324,222, which is a division of application No. 09/528,581, filed on Mar. 20, 2000, now Pat. No. 6,906,811.

(30) Foreign Application Priority Data

| Mar. 18, 1999 | (JP) | 11-074000 |
| Mar. 18, 1999 | (JP) | 11-074001 |
| Apr. 12, 1999 | (JP) | 11-104237 |

(51) Int. Cl.
*G06F 15/00* (2006.01)
*G06F 3/12* (2006.01)
*G06K 1/00* (2006.01)

(52) U.S. Cl.
USPC .................................. 358/1.15; 358/1.13

(58) Field of Classification Search
None
See application file for complete search history.

(56) References Cited

U.S. PATENT DOCUMENTS 5,594,653 A    1/1997  Akiyama et al.
5,803,623 A    9/1998  Iwasaki (Continued)

FOREIGN PATENT DOCUMENTS

CN    1113329      12/1995
EP    0652533 A2   5/1995

(Continued)

OTHER PUBLICATIONS

European Search Report Application No. 10185050.1 issued on Apr. 7, 2011.

*Primary Examiner* — Douglas Tran

(57) ABSTRACT

An imaging device receives from a host device image data and commands including a normal command, an image data command associated with a parameter indicative of a data length of the image data to be processed, and a real-time command to be processed prior to the normal command. The imaging device comprises a receiver configured to receive the image data command and subsequently the parameter from the host device; and a processor configured to process the parameter without processing the real-time command, even if a data sequence identical to a byte stream of the real-time command is included in the image data, after processing the image data command.

4 Claims, 14 Drawing Sheets

(56) References Cited

U.S. PATENT DOCUMENTS

| | | |
|---|---|---|
| 5,937,148 A | 8/1999 | Okazawa |
| 6,453,208 B2 | 9/2002 | Miyasaka et al. |
| 6,459,496 B1 | 10/2002 | Okazawa |
| 6,785,012 B2 | 8/2004 | Okazawa |

FOREIGN PATENT DOCUMENTS

| | | |
|---|---|---|
| EP | 0759590 A1 | 2/1997 |
| EP | 0769737 A2 | 4/1997 |
| EP | 0 811 947 A1 | 12/1997 |
| JP | 61195446 | 8/1986 |
| JP | 62102329 | 5/1987 |
| JP | 5185699 | 7/1993 |
| JP | 6227091 | 8/1994 |
| JP | 7186494 | 7/1995 |
| JP | 8292851 | 11/1996 |
| JP | 962466 | 3/1997 |
| JP | 9146723 | 6/1997 |
| JP | 9164747 | 6/1997 |
| JP | 9323463 | 12/1997 |
| JP | 10278364 | 10/1998 |
| JP | 10333856 | 12/1998 |

PROCESSING OF COMMANDS IN AN IMAGING DEVICE

CONTINUING APPLICATION DATA

This application is a continuation of, and claims priority under 35 U.S.C. §120 on application Ser. No. 13/463,337, filed May 3, 2012, which is a continuation of application Ser. No. 13/402,300 (now U.S. Pat. No. 8,345,274), filed Feb. 22, 2012, which is a continuation of application Ser. No. 13/166, 656 (now U.S. Pat. No. 8,144,357, filed Jun. 22, 2011, which is a continuation of application Ser. No. 12/892,507 (now U.S. Pat. No. 7,995,226), filed Sep. 28, 2010, which is a divisional of application Ser. No. 11/955,289 (now U.S. Pat. No. 7,826,075), filed Dec. 12, 2007, which is a continuation of application Ser. No. 11/064,895 (now U.S. Pat. No. 7,324, 222), filed Feb. 24, 2005, which is a divisional of application Ser. No. 09/528,581 (now U.S. Pat. No. 6,906,811), filed Mar. 20, 2000. This application also claims priority under 35 U.S.C. §119 on Japanese patent application nos. 11-074000 and 11-074001, both filed Mar. 18, 1999, and on Japanese patent application no. 11-104237, filed Apr. 12, 1999. The content of each application identified above is incorporated by reference herein in its entirety.

BACKGROUND OF THE INVENTION

1. Field of the Invention

The present invention relates to the operation of the imaging device, e.g., a printer, in processing a data stream containing bit-map data and commands.

2. Description of the Related Art

Printers as the term is used in this text include all types of printing apparatuses used for printing text and/or graphics on various types of printing material such as paper. Typically, a printer is connected to or an integral part of some kind of information processing apparatus (simply referred to as host device or host computer hereinafter) that controls the printer by sending to the printer a stream of data including data that represent text and graphics to be printed as well as control commands for controlling the printer itself.

The data sent from a host device to a printer can be regarded as a bit stream as well as a byte stream. Control commands are often composed of bytes, i.e., units of 8 bits, and, in many cases, of multiple bytes. Normally, a command is composed of a command identifier, one or more command parameter bytes following the command identifier when needed, and additional command data when needed. There are two main command types, a first or normal command type and a second command type, the so-called "real-time commands". Normal commands are typically processed in the FIFO (first-in-first-out) order in which the printer receives them. Real-time commands are high priority commands that are processed with precedence over normal commands as is described in detail in EP-A-0 769 737. Real-time commands and normal commands can be distinguished from one another by means of the respective command identifiers.

An interface in the printer is provided to connect to and allow communication with a host device. When the interface receives one or more bytes of data, a receive interrupt is issued and invokes a particular interrupt process. This interrupt process comprises:

(1) Detecting whether or not a real-time command has been received and immediately executing the process corresponding to the real-time command if a real-time command has been received; and (2) Storing the received data in a receive buffer.

When the interrupt process is completed, the printer returns to the normal processing. In general, the interrupt process is carried out repeatedly until a CR (carriage return) is received or the receive buffer becomes full. In the normal processing, a data stream stored in the receive buffer is interpreted and, in accordance with the interpreted data, a print image (bit map) is generated and written into a print buffer. The data in the receive buffer are processed in a FIFO (first in, first out) order. Real-time commands are processed immediately overriding the FIFO order. When the normal processing detects a real-time command in the receive buffer, this command is ignored because it has already been executed in the real-time processing mentioned above.

A data stream for printing text typically contains the byte values of the ASCII codes of the characters to be printed. On the other hand, a data stream for printing images/graphics, for loading a user-defined font into the printer or the like, is typically composed of so-called "image data" representing each pixel or dot of an image/graphic or of a character by one bit to express black and white or multiple bits if more than two colors are to be expressed. When a bit stream of such image data is thought of as a byte stream, the value of each byte in the stream is not restricted to a value of any of the ASCII codes representing characters. In contrast to this, in decimal notation, each value between 0 and 255 is possible, and there is no restriction regarding possible combinations of byte values in such image data stream.

For this reason, an image data stream can happen to include what will be referred to as "false real-time command" hereinafter, namely a data sequence identical to the byte stream of a (true) real-time command. If the printer interprets such data sequence as a real-time command, the false real-time command is carried out even though in fact the data sequence was not meant to be a real-time command. Execution of a false real-time command can cause a variety of problems. For instance, as a result of the execution of the false real-time command the printer might send data to the host computer, which is not ready to receive the data.

SUMMARY OF THE INVENTION

One aspect of the invention provides an imaging device adapted to receive from a host device image data and commands including a normal command, an image data command associated with a parameter indicative of a data length of the image data to be processed, and a real-time command to be processed prior to the normal command. The imaging device comprises a receiver configured to receive the image data command and subsequently the parameter from the host device; and a processor configured to process the parameter without processing the real-time command, even if a data sequence identical to a byte stream of the real-time command is included in the image data, after processing the image data command.

Preferably, the processor is further configured to process the real-time command received from the host device, after processing the image data command and the parameter.

Another aspect of the invention is embodied in a method of controlling an imaging device adapted to receive from a host device image data and commands including a normal command, an image data command associated with a parameter indicative of a data length of the image to be processed, and a real-time command to be processed prior to the normal command. The method comprises: (a) receiving the image data command and subsequently the parameter from the host device; (b) after step (a), processing the image data command; and (c) after step (b), processing the parameter without processing the real-time command, even if a data sequence identical to a byte stream of the real-time command is included in the image data.

The method may further comprise: (d) processing the real-time command from the host device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Basic Structure of Printer

Figure 1:
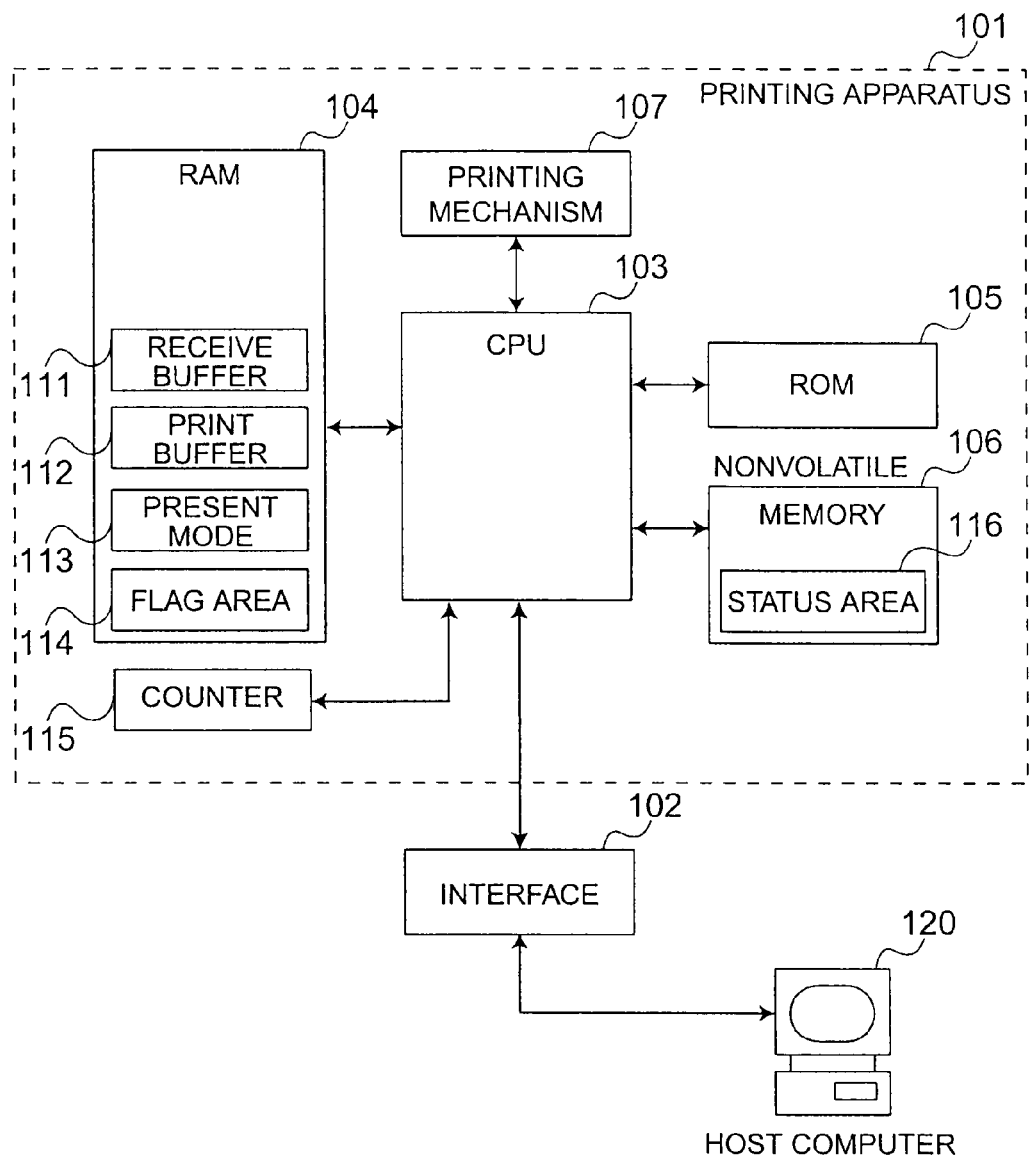
FIG. 1 is a block diagram showing the outline of a printer according to this invention.

FIG. 1 is a block diagram of a printer embodying the present invention. The printer, generally denoted as 101, is connected through an interface 102 to a host computer 120 (an information processing apparatus), and includes, as principal components, a CPU (Central Processing Unit) 103, a RAM 104, a ROM 105, a nonvolatile memory 106, and a printing mechanism 107. ROM 105 stores control programs to be executed by the CPU to control the printer. RAM 104 serves as a working memory of the CPU. Certain parts of the RAM are used for particular purposes such as a receive buffer 111, a print buffer 112, a state memory 113, a flag memory 114 and, where required, a counter 115. Typically, the receive buffer 111 is organized as a ring buffer. The nonvolatile memory 106 is an EEPROM (Electrically Erasable Programmable ROM) or a flash memory, for instance. Part of this nonvolatile memory 106 serves as a status information memory 116 for storing status information of the printer to be sent to the host computer 120 in response to a status request from the host computer 120. It is to be noted that, depending upon the particular field of application of a printer, the nonvolatile memory 106 is not always required and is not essential to the practice of the present invention.

When the interface 102 receives data from the host computer 120, a receive interrupt is generated that causes the CPU 103 to start a receive interrupt process by which the received data is written into the receive buffer 111. In this interrupt process, when the CPU identifies a real-time command among the data received, it carries out a real-time process corresponding that command, unless this is disabled. In addition the received data whether or not it represents a real-time command or part of it is written into the receive buffer 111. When the interrupt process is finished, the control of the CPU 103 returns to the normal processing.

In the normal processing, the CPU 103 interprets a data stream stored in the receive buffer 111 as print commands or a printer setting commands, retrieves font data from memory (ROM 105) as required and generates a printing image (a bit map representation of the text or graphic to be printed) in the print buffer 112. The way in which the printing image is generated based on the data received from the host computer and font data stored in the printer is well known so that further details will be omitted here. When the printing image in the print buffer 112 reaches a predetermined size, for instance, one line, the printing mechanism 107 is driven in accordance with the printing image so that characters or graphics are printed on a printing medium such as paper.

Furthermore, if a data stream in the receive buffer 111 is a font definition command (a command transmitting font data that represent user-defined characters), the font data is stored in the RAM 104 (note that the font data of such font definition command are image data as this term is been defined above). The contents of the nonvolatile memory 106 is updated in accordance with the font definition command.

First Embodiment

Interrupt Process in Printer

Figure 2:
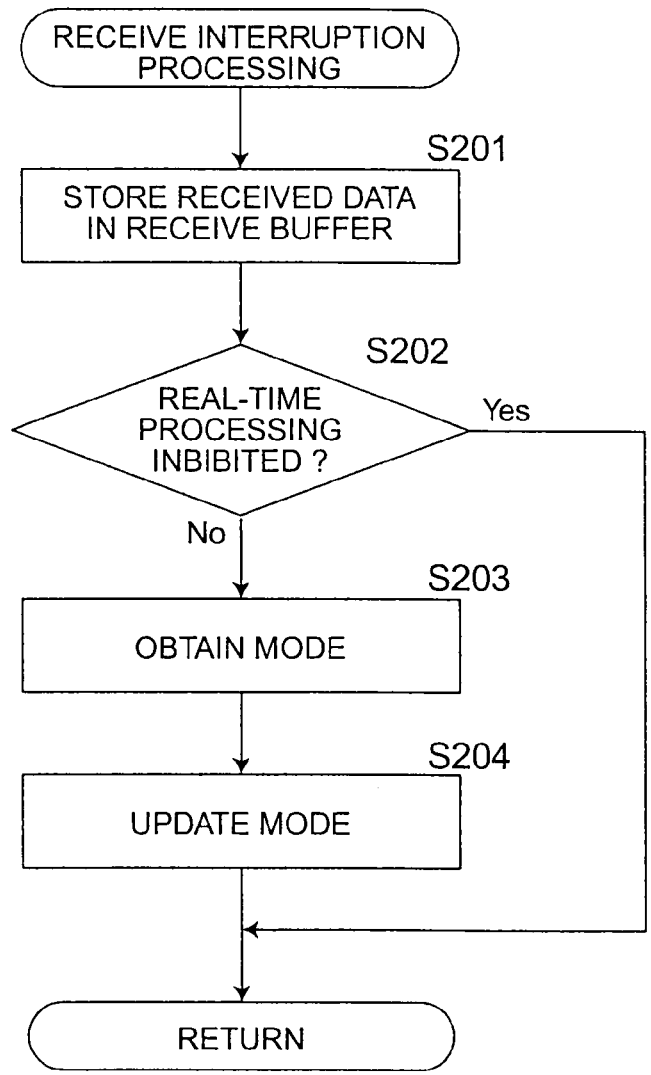
FIG. 2 is a flow chart of a receive interrupt process in a printer according to a first embodiment of the invention.

FIG. 2 is a flow chart of the receive interrupt process in printer 101 according to a first embodiment of the invention. This interrupt process begins when the interface 102 of the printer 101 receives data from the host computer 120. The following description of all embodiments assumes that an interrupt invoking the receive interrupt process in generated whenever the interface 102 receives one byte of data. It goes without saying that a similar process applies to the case in which the interrupt is generated whenever the interface receives any predetermined number of bytes. Whether the interrupt is generated in response to one, two or more bytes being received by the interface is not critical to the practice of the present invention.

For an easier understanding of the principles of the present invention this and the following embodiments will be explained with reference to certain commands as defined below.

Normal Commands:

1) ESC* m nL nH d1 . . . dk: this is an image print command used to send image data representing a bit map image (where parameter m is a fixed value, nL and nH designate the number k=(nH·256+nL) of bytes of image data to follow, and d1 . . . dk are the bytes of image data). This command makes the printer print a graphic represented by the image data.

2) ESC & s n m a d1 . . . dk: this is a font definition command used to send font image data representing user-defined characters to the printer (where s specifies the number of bytes in the vertical direction, a specifies the number of dots in the horizontal direction, n designates the first character code in a sequence of user-defined characters, m designates the last character code, and d1 . . . dk are the bytes of image data defining the character(s)).

3) FSg1 m a1 a2 a3 a4 nL nH d1 . . . dk: this command is used for sending image data to be written in a user-defined nonvolatile memory (where m=0, a1-a4 designate the start address at which the data are to be stored, nL and nH designate the number k=nH·256+nL bytes of image data to be stored, and d1 to dk are the bytes of image data).

Each of the commands 1) to 3) defined above transmits image data to the printer. As representatives of commands that transmit image data to a printer these commands will also be collectively referred to as "image data commands".

Real-Time Commands:

The byte streams of the following real-time commands are expressed through the use of the mnemonics of the ASCII code.

1) "DLE EOT NUL": this command makes the printer send status information to the host computer.

2) "DLE EOT BEL": this command makes an ink jet printer send ink status information to the host computer.

3) "DLE EOT BS": this command makes a printer equipped with an MICR (Magnetic Ink Character Recognition) function send status information regarding the MICR function to the host computer.

4) "DLE ENQ": A real-time request requesting the printer to perform a certain action.

5) "DLE DC4 SOH": This command makes the printer output a pulse at a certain pin of a certain connector. The pulse can be used to control a peripheral device connected to the printer, for instance.

6) "DLE DC4 STX": This command makes the printer turn off the power supply.

7) "DLE DC4 BS": This command makes the printer clear the receive buffer.

8) "DLE EOT EOT": This command makes the printer disregard real-time commands for a predetermined period of time (for example, 1 second) (also referred to as RTP (real-time processing) disable command).

As described above, the interrupt process starts when the interface 102 receives data from the host computer 120. After starting, the CPU 103 first writes the received byte into the receive buffer 111 (step S201). Subsequently, the CPU 103 checks whether an RT flag stored in the flag memory 114 is set or not (step S202) (while it is assumed here that the RT flag is set to indicate that the real-time processing is presently enabled and cleared (not set) to indicate that the real-time processing is presently disabled, it could just be opposite). When the RT flag is not set (Yes at step S202), i.e., the real-time processing is disabled, the interrupt process comes to an end. As will be understood, in this embodiment the flag memory 114 is used as an indication device indicating either an enabled state (RT flag is set) or a disabled state (RT flag is not set).

If the RT flag is set (No at step S202), the CPU 103 reads a value stored in state memory 113. As will be explained in more detail later, this value indicates the receive status, more particularly, it indicates whether or not a real-time command is currently being received. After it has determined the current receive status, the CPU 103 updates the value in the state memory 113, if required, on the basis of the value of the byte received in step S201 and performs a real-time processing, if required, as will be explained with reference to a state transition diagram shown in FIG. 3 (step S204). The interrupt process is then terminated.

Figure 3:
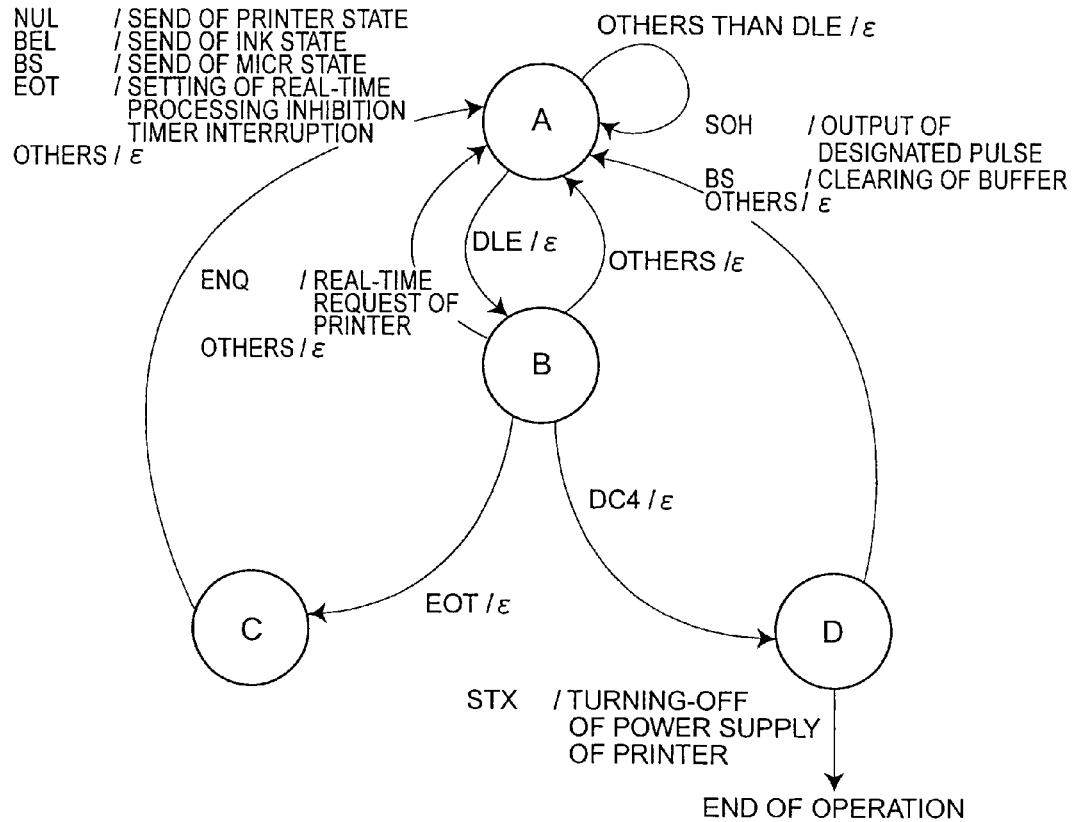
FIG. 3 is an explanatory illustration of state transitions of the receive interrupt process in FIG. 2.

FIG. 3 is an explanatory diagram of state transitions during data reception. As will be appreciated by those skilled in the art, this state transition diagram (like those explained later) depends upon the structure of the real-time commands use in a particular case. The diagram in FIG. 3 is based on the real-time commands defined above.

In FIG. 3, a state A signifies that the byte received last, i.e., in the immediately preceding interrupt process, did not belong to a real-time command. In state A, when the value of the byte received in step S201 corresponds to DLE indicating the first byte of a real-time command, shifting takes place to a state B.

State B, thus, signifies that the byte received last was the first byte DLE of a real-time command. If state B is detected in step S203, the following state transition (and, thus, the updating in step S204) takes place in accordance with the value of the byte received in step S201:

if the byte corresponds to EOT, shifting to a state C is performed;

if the byte corresponds to ENQ, the real-time command DLE ENQ is executed and subsequently shifting to state A is performed;

if the byte corresponds to DC4, shifting to a state D is performed; and if the byte corresponds to none of EQT, ENQ and DC4, the byte stream being received is not a real-time command, and shifting to state A takes place.

State C signifies the two last received bytes correspond to a real-time command beginning DLE EOT. If state C is detected in step S203, the following transition takes place in accordance with the value of the byte received in step S201:

if the byte corresponds to NUL, the real-time command DLE EOT NUL is executed (status information is sent to the host computer 120) and, subsequently, shifting to state A is performed;

if the byte corresponds to BEL, the real-time command DLE EOT BEL is executed (ink status information is sent to the host computer 120) and, subsequently, shifting to state A is performed;

if the byte corresponds to BS, the real-time command DLE EOT BS is executed (MICR status information is sent to the host computer 120) and, subsequently, shifting to state A is performed;

if the byte corresponds to EOT, the real-time command DLE EOT EOT is executed and, subsequently, then shifting to state A is performed (execution of DLE EOT EOT comprises clearing the RT flag in the flag memory 114, and setting a timer to set the RT flag in a timer interrupt process after lapse of a predetermined period of time (for example 1 second) from the moment the time is set); and if the byte corresponds to none of NUL, BEL, BE and EOT, the byte stream being received is not a real-time command, so that shifting to state A is performed.

State D means the two last received bytes correspond to a real-time command beginning DLE DC4. If state D is detected in step S203, the following transition takes place in accordance with the value of the byte received in the step S201:

if the byte corresponds to SOH, the real-time command a real-time DLE DC4 SOH is executed (a designated pulse is output), and then shifting to state A is performed;

if the byte corresponds to STX, the real-time command a real-time DLE DC4 STX is executed, i.e., the power supply of the printer is turned off;

if the byte corresponds to BS, the real-time command a real-time DLE DC4 BS is executed (the receive buffer 111 and the print buffer 112 are cleared), and then shifting to state A is performed; and if the byte corresponds to none of SOH, STX and BS, the byte stream being received is not a real-time command, so that shifting to state A is performed.

As described above, whenever a receive interrupt is generated, a check is made as to whether or not the real-time processing is disabled. The time needed for this check is on the order of several microseconds. Because of a relatively simple state transition processing described above, only a short time is required for the receive interrupt process.

Normal Processing in Printer

Figure 4:
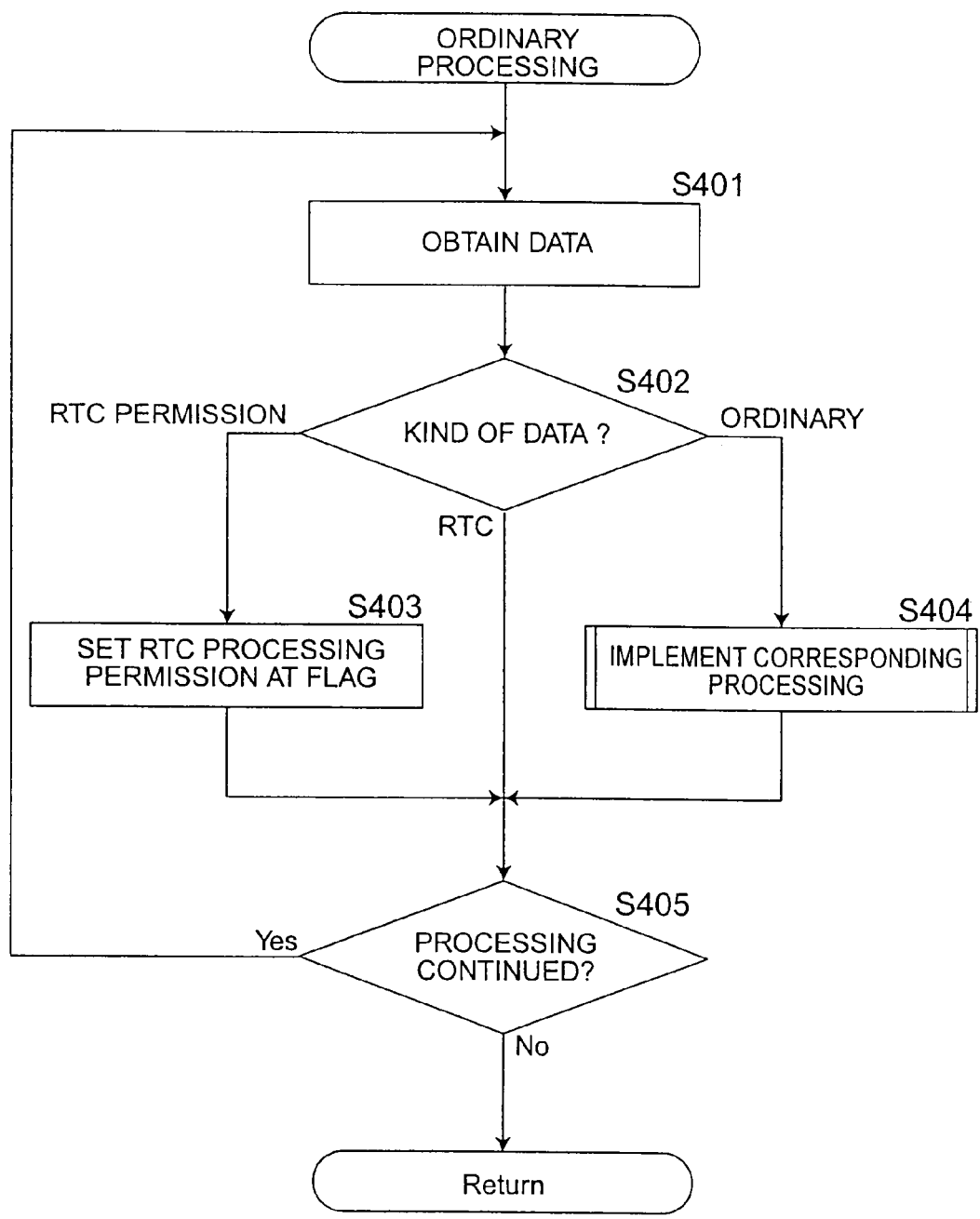
FIG. 4 is a flow chart showing the outline of a normal processing in printer corresponding to the interrupt process in FIG. 2.

The normal processing is for interpreting and printing the data the printer 101 receives. FIG. 4 is a flow chart of such normal processing. As will be understood by those skilled in the art, this normal processing can be interrupted any time by the interrupt process of FIG. 2 in response to a receive interrupt.

Incidentally, as long as unprocessed data remain in the receive buffer 111, the CPU 103 obtains and processes that data, while, when no data remain, it waits until new data is written into the receive buffer 111 through the foregoing interrupt process. In this way, a quasi-multitasking processing is implemented. In the following description, for simplicity, the process for retrieving one byte from the receive buffer 111 and the repeated processes for retrieving multiple bytes from the receive buffer 111 will together be referred to as "obtaining" data from the receive buffer. In addition, in this embodiment, a command for enabling the real-time processing is implemented as a normal command.

First of all, the CPU 103 obtains data from the receive buffer 111 (step S401), and checks the kind of that data (step S402). If the data represent a command to enable real-time processing (step S402; RTP enable), the CPU 103 sets the RT flag in the flag memory 114 (step S403), and the procedure returns to step S401. On the other hand, if the data represent a normal command other than the command to enable real-time processing (step S402; normal), the CPU 103 carries out the processing corresponding to that command (step S404). This processing includes printing of text or graphics, printing of images, and storing the font data of a font definition command. If the processing is continued (step S405; Yes), the procedure returns to step S401.

If the data obtained in step S401 represent a real-time command (step S402; RTC) and if the processing is continued (step S405; Yes), the procedure returns to step S401. This means, the real-time command is not executed because it has already been executed, in the receive interrupt process. Each image print command has a parameter that indicates the length of image data. The parameter follows in the command symbol of the print command. According to the format of the command, the host sends image data after the parameter indicating the data length. Therefore, when CPU in the printer interprets an image print command, it can also read the length of the data at substantially same time.

If the obtained data is the image data command in step S402 in FIG. 4 CPU (printer side) repeats to read the image data from the receive buffer and write it to the print buffer in accordance with determined cycle by the parameter. Therefore, if a false RTC is included in the image data, it is sent to the print buffer in step S404.

If the receive interrupt processing and the normal processing are provided in this way, when the host computer 120 intends to send to the printer a data stream of a normal command (for example, an image print command or a font definition command) including, in the command parameter and command data stream following the command identifier, a false real-time command, it first sends an RTP disable command, then that normal command and finally an RTP enable command. This makes it possible to prevent the real-time processing from being executed in response to a false real-time command included accidentally in a normal command.

Host Computer

Figure 5:
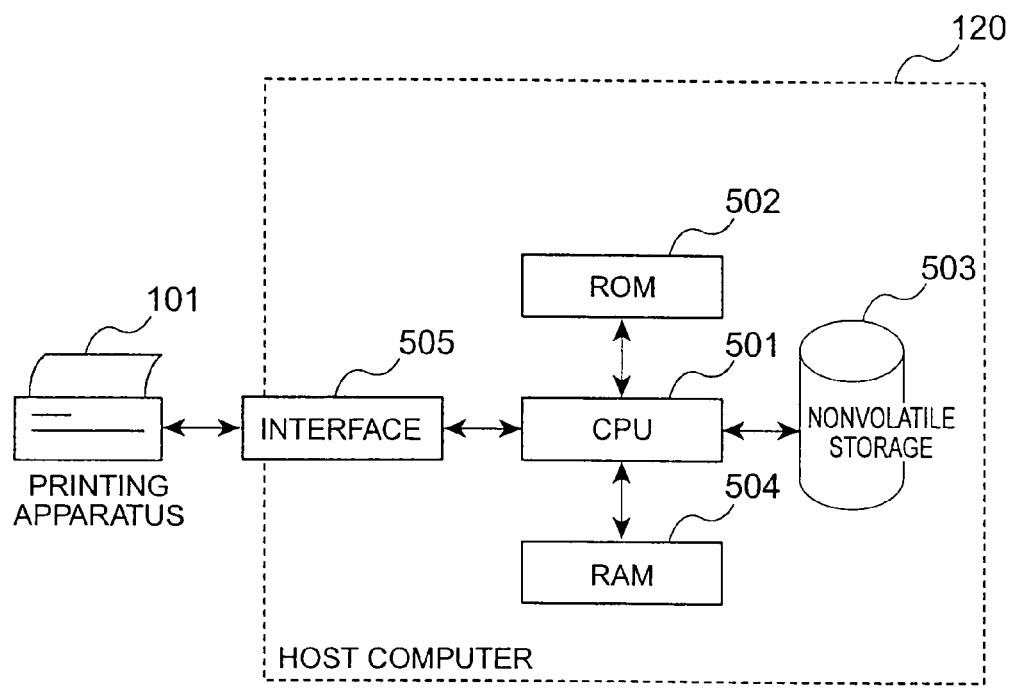
FIG. 5 is a block diagram showing the outline of a host computer according to the invention.

FIG. 5 is a block diagram showing a host computer according to this invention.

The host computer 120 is controlled by a CPU 501. Upon turning-on of a power supply to the host computer 120, the CPU 501 can carry out an IPL (Initial Program Loader) stored at a predetermined location in a ROM 502 for beginning the processing, and further can run programs stored in a nonvolatile storage device 503 such as a hard disk, a floppy disk, or a CD-ROM (Compact Disk ROM). In running the programs, a RAM 504 is used as a temporary storage device. In addition, the host computer 120 can be equipped with an input unit (not shown), such as a keyboard or a mouse, and a display unit (not shown).

Figure 6:
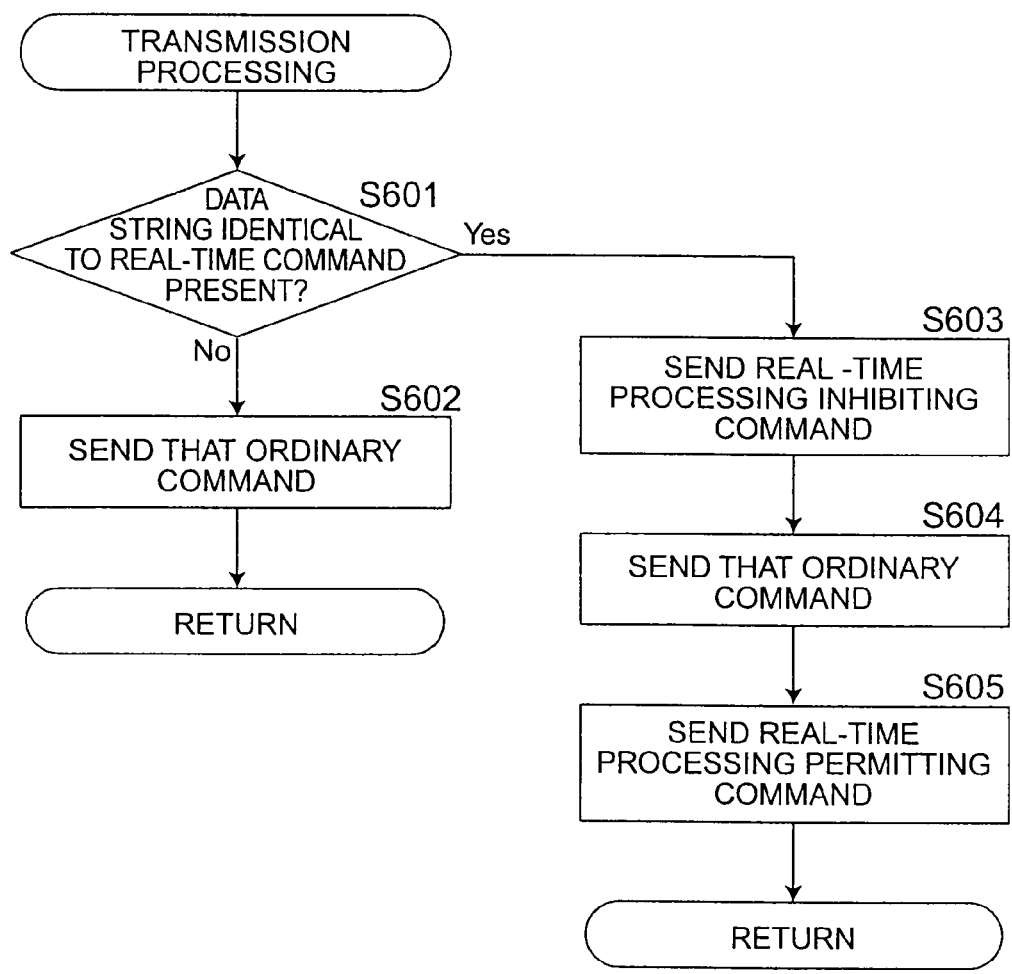
FIG. 6 is a flow chart showing a process implemented in the host computer.

During execution of application programs for printing text or graphics, a data stream of a print command is fed through an interface 505 to a printer. FIG. 6 is a flow chart showing the process for sending such data stream of a normal command to the printer to make the printer print text or graphics in accordance with the data or store the data as font data. This process is generally implemented by a program called a printer driver, which is installed in the host computer from a recording medium, such as a floppy disk. The process starts, for example, in response a print request from an application program to the operating system.

First, the CPU 501 checks whether or not the data stream of a normal command to be sent includes a false real-time command (step S601). If this is not the case (step S601; No), the CPU 501 sends the data stream (step S602), and then terminates this process. On the other hand, if a false real-time command is included (step S601; Yes), the CPU 501 sends an RTP (real-time processing) disable command (step S603), subsequently sends the data stream of that normal command, and then sends an RTP enable command (step S605). This processing is then terminated.

A byte stream representing such normal command can be quite long. If the RTP disable command is sent to precede such long byte stream and the RTP enable command is sent to follow the byte stream, the real-time processing in the printer may be disabled for a correspondingly long time. This can be avoided by dividing the byte stream into individual blocks. For example, for printing of an image, a decision is made as to whether the volume (e.g., the number of bytes (or bits)) of that normal command is such that the printer can process it within a predetermined time (for example, 1 s). If yes, steps S603 to S605 are executed as described. On the other hand, if the predetermined number is exceeded, that normal command is divided into a plurality of shorter normal commands. Steps S603 to S605 are then executed separately for each of the shorter normal commands. Between the end of one sequence of steps S603 to 605 and the beginning of the next sequence of the same steps, a check is made as to whether a real-time command to the printer is necessary or not, and if necessary, that real-time command is sent out. With such processing, the maximum waiting time for a real-time command to be executed in the printer is only the aforesaid predetermined time (1 s) in the case of a real-time processing needed.

Incidentally, the decision as to whether or not a normal command can be processed in the printer within the predetermined time can rely simply on the comparison of the number of bits or bytes of the normal command with a predetermined value.

Second Embodiment

Interrupt Process in Printer

Figure 7:
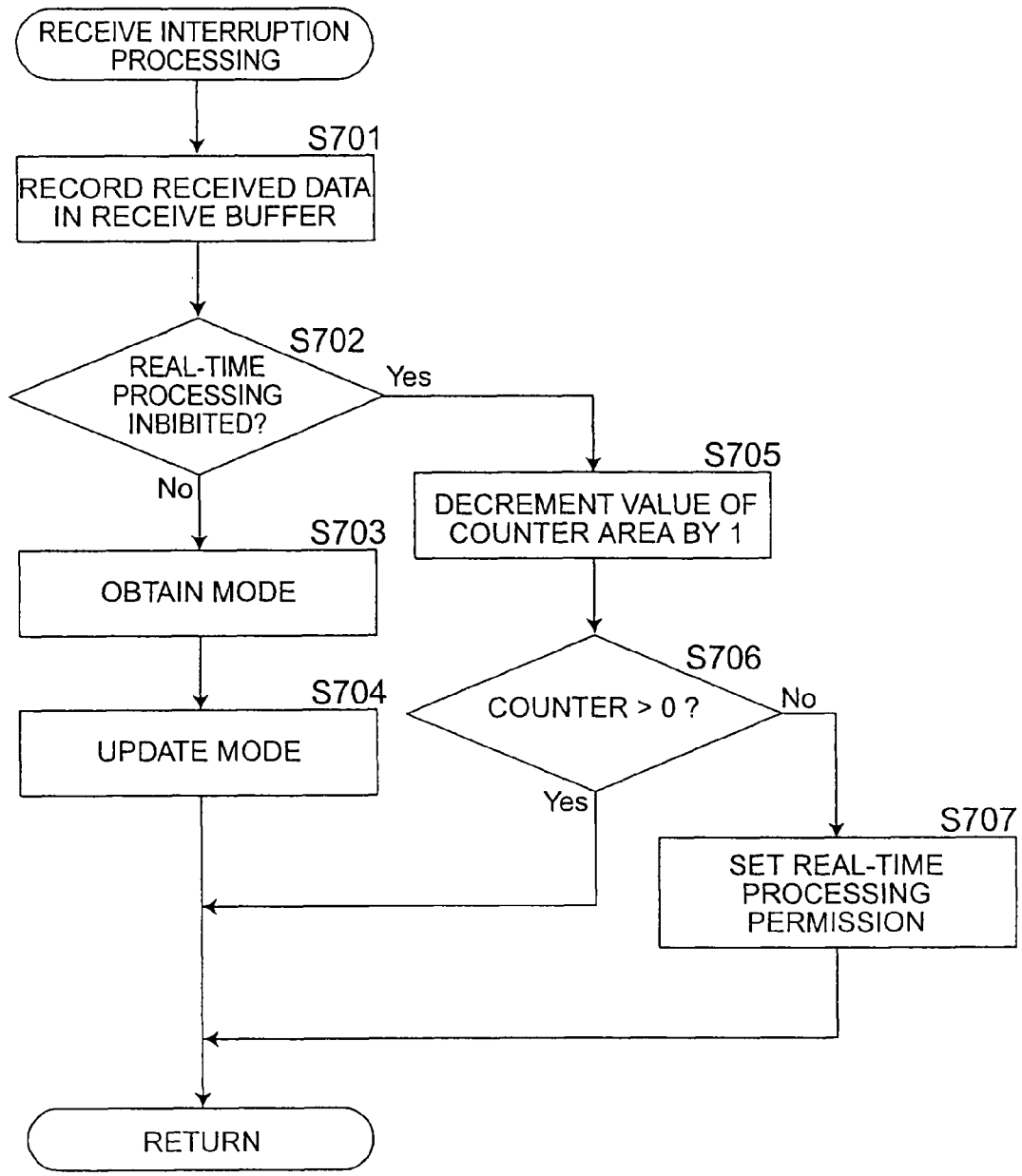
FIG. 7 is a flow chart of a receive interrupt process in a printer according to a second embodiment of the invention.

FIG. 7 is a flow chart of the receive interrupt process in a printer 101 according to a second embodiment of this invention. This second embodiment differs from the first one by employing a different RTP disable command instead of the RTP disable and RTP enable commands in the first embodiment. The RTP disable command in this embodiment is composed of a three byte command identifier and a two byte command parameter, and is thus 5 bytes in total:

"DLE EOT EOT n m": this signifies that real-time processing of the subsequent k=n·256+m bytes is to be disabled.

A counter 115 required in the printer of this second embodiment can be implemented by means of a certain part of RAM 104 (in cooperation with the CPU 103).

Figure 8:
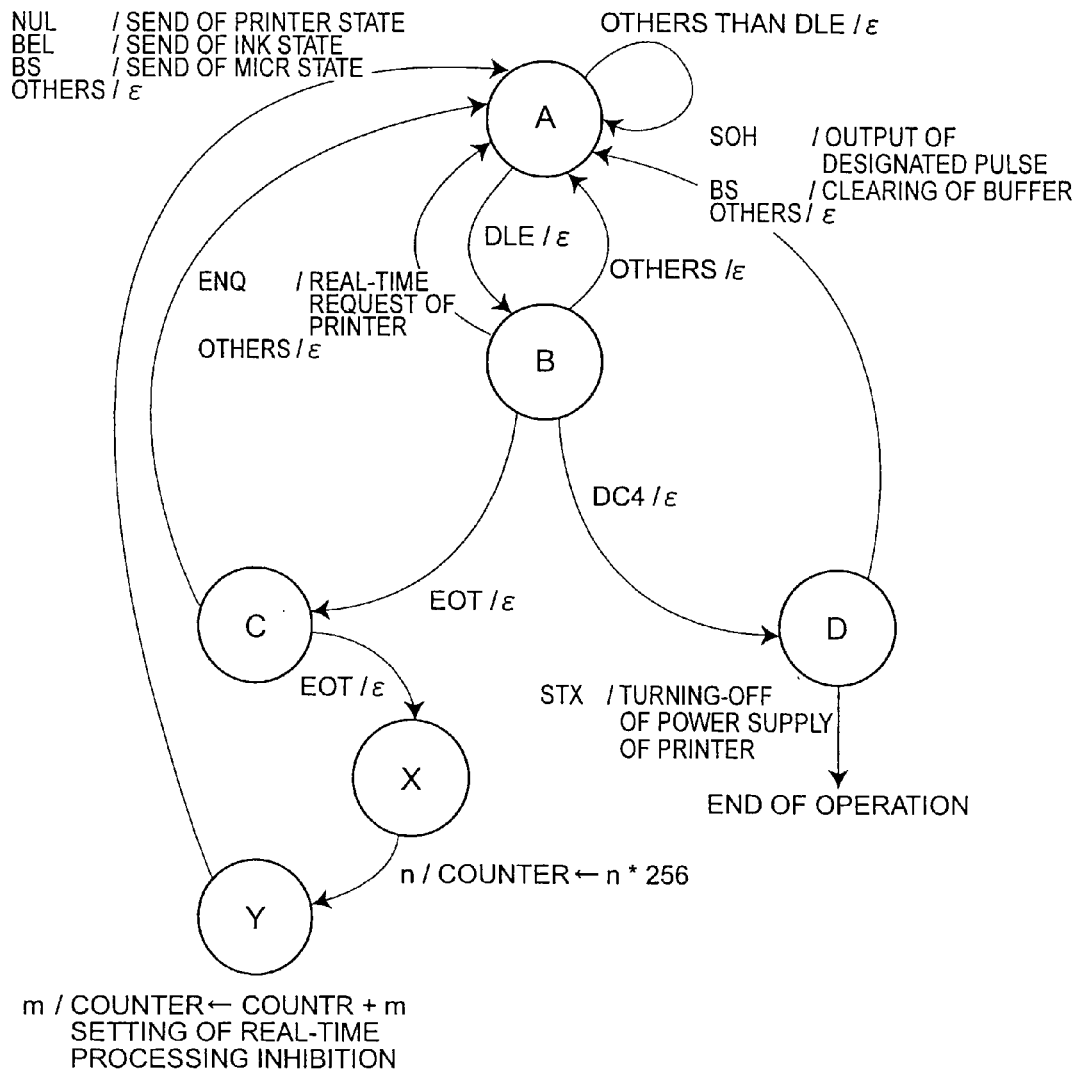
FIG. 8 is an explanatory illustration of state transitions of the receive interrupt process in FIG. 7.

Steps S701, S702 and S703 in FIG. 7 are virtually the same as steps S201, S202 and S203, respectively, in FIG. 2. Step S704 in FIG. 7 differs from step S204 in FIG. 2 only in that the processing in step S804 is in accordance with the state transition diagram if FIG. 8 instead of that in FIG. 3. Most of the state transition diagram in FIG. 8 is identical to the state transition diagram shown in FIG. 3, however it differs in processing when EOT is received in the state C. When the byte received in step 701 corresponds to EOT and step S703 indicates state C, shifting to a state X takes place.

When the interrupt process is then invoked again and step S703 indicates state X, the counter mentioned above is preset to the value n·256 where n is the value of the byte received in step 701. Subsequently, and still as part of step S704, shifting to a state Y takes place. When the interrupt process is then invoked again and step S703 indicates state Y, m is added to the count value of the counter 115, the RT flag in the flag memory 114 is cleared, and then shifting to state A takes place.

If the RT flag is not set in step S702 indicating that real-time processing is disabled (step S702; Yes), the count value of counter 115 is decremented by one (step S705), and a check is made as to whether or not the decremented count value is still greater than zero (step S706). If it is greater than zero (step S706; Yes), this interrupt process comes to an end. If the count value is not greater than zero (step S706; No), the RT flag in the flag memory 114 (step S707) is set, and then this interrupt process terminates According to this second embodiment, since the RTP disable command allows setting the duration while it is effective in terms of a number of bytes, there is no need for an RTP enable command. When the host computer needs to send, as a normal command, a byte stream that includes a false real-time command, it first sends the RTP disable command whose command parameters n and m are set to correspond to the length of the normal command byte stream to be sent, and then sends that normal command byte stream. The possibility of dividing such normal command into a plurality of shorter normal commands as explained in the context of the first embodiment applies to this second embodiment in the same way.

If false real-time commands embedded in a data stream of a normal command are not expected to occur very often, because the image print command is rarely used, for instance, and it is mainly during loading a user-defined font into the printer that a false real-time command may occur, it is possible to use a hardware element rather than flags in a flag memory, e.g., as a dip switch, as an indication device indicating the enabled or disabled state for the execution of the real-time processing.

Third Embodiment

Interrupt Process in Printer

Of a plurality of real-time commands, in fact, there are some which do not create a problem even if being executed in the middle of an image data stream. Additionally, in a case in which the printer is part of a POS (Point Of Sale) system and the image data represent a logo of the store in which the POS system is installed, the data can be prepared in advance so as not to be almost indistinguishable from real-time commands, and in such a case, for example, when a status request is made from an application program, the transmission of a real-time command therefor does not create a problem. For such case, the following command is defined as a normal command to disable and enable the real-time commands individually:

GS (D m n: "GS (D" is the command identifier, and m and n are command parameters; m is used to specify real-time commands and n is used to enable/disable the specified command.

Assuming that, among the real-time commands, there are eight commands or less that one might wish to disable/enable. Parameter m represents one byte, i.e., 8 bits. Each of the 8 bits corresponds to a respective one of the eight or less real-time commands. If, in binary notation, m is 10000011, the first, the seventh and the eighth command are an object of the disable/enable control, i.e., "1" selects a command and "0" deselects it. If, again in binary notation, the parameter n is 10000010, the first and the seventh command are enabled while the eighth command is disabled, i.e., "1" enables while "0" disables. Whenever the CPU identifies this normal command, it sets or resets RT flags for the individual real-time commands in the flag memory 114 in accordance with the parameters m and n. When the RT flag for a particular real-time command is set, the command is enabled and otherwise it is disabled.

Figure 9:
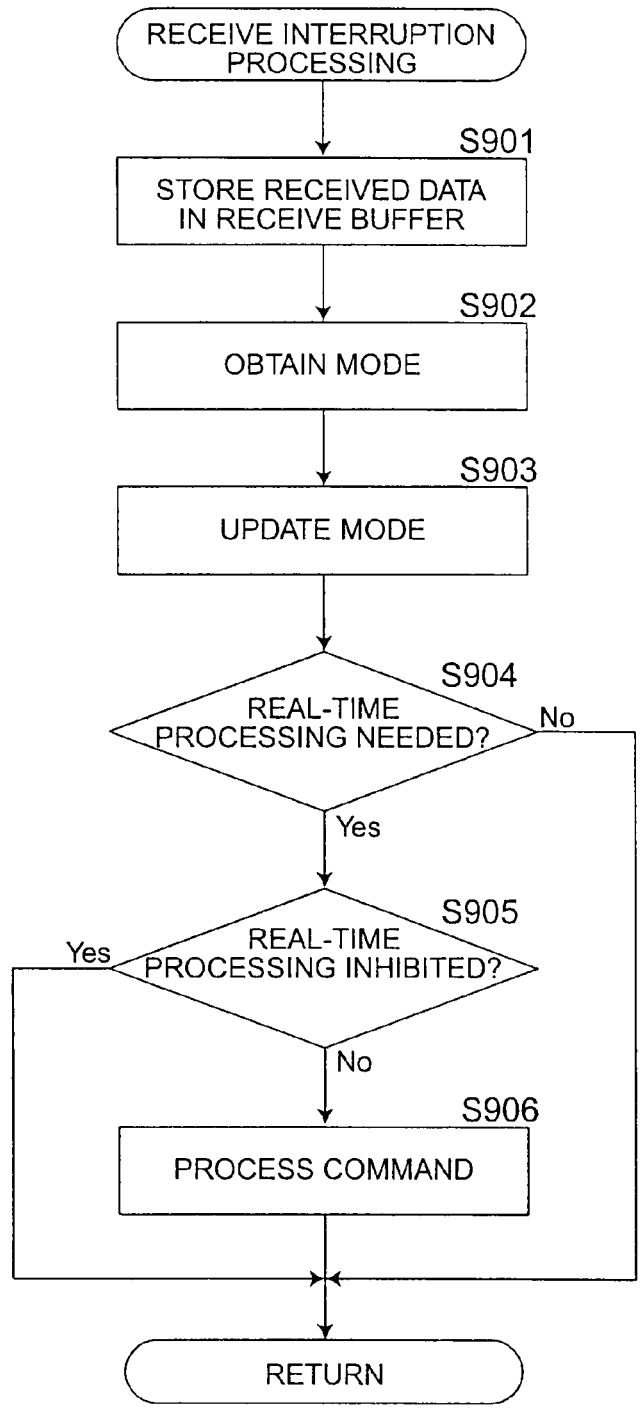
FIG. 9 is a flow chart of a receive interrupt process in a printer according to a third embodiment of the invention.

FIG. 9 is a flow chart of the receive interrupt process in a printer 101 according to a third embodiment of this invention making use of the RTP disable/enable command GS (D m n. Steps S901 and S903 in the interrupt process shown in FIG. 9 are the same as steps S201 and S203, respectively, in FIG. 2. Steps S202 and S204 in FIG. 2 are replaced by steps S903 to S906 in FIG. 9.

After it has determined the current receive status in step S902, the CPU 103 updates the value in the state memory 113, if required, on the basis of the value of the byte received in step S901 and in accordance with a state transition diagram similar to that shown in FIG. 3 (step S903). In performing the state updating, the CPU 103 decides whether or not there is a need to perform a real-time processing (step S904), i.e., whether or not the byte received in step S901 is the last byte of a real-time command. If the real-time processing is necessary (step S904; Yes), the CPU 103 checks the RT flags in the flag memory 114 to make a decision as to whether the particular real-time command is presently disabled (step S905). If it is not disabled (step S905; No), the processing corresponding to the real-time command is carried out (step S906). If it is disabled (step S905; Yes), this interrupt process terminates without real-time processing.

This checking whether or not a particular real-time command is disabled whenever a data stream representing a real-time command is received, requires a time on the order of several microseconds. Thus, because of the relatively simple state transition processing, only a short time is required for the receive interrupt process.

Although the foregoing processing is based on state transitions similar to the state transition diagram shown in FIG. 3, there are differences in detail. That is:

1) when the byte received in step S901 corresponds to EOT while step S902 indicates state C, the processing of shifting to the state A does not take place; and 2) in this third embodiment, the each real-time command can be individually disabled/enabled, and when a disabled real-time command is received, instead of executing the command and then shifting to state A, only state shifting to state A takes place.

Normal Processing in Printer

Figure 10:
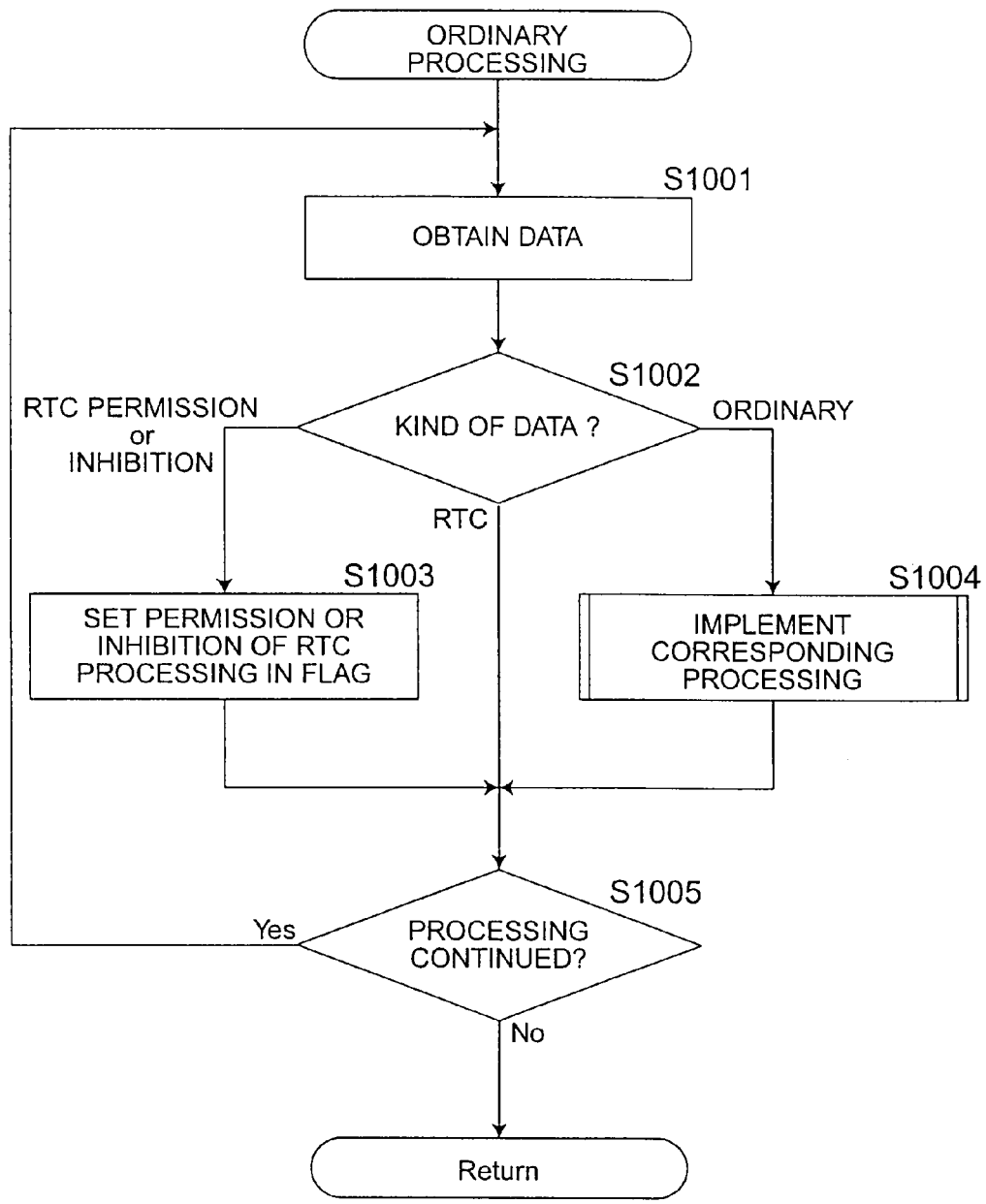
FIG. 10 is a flow chart showing a normal processing in the printer corresponding to the interrupt process in FIG. 9.

FIG. 10 is a flow chart of the normal processing in the printer 101 according to the third embodiment. This normal processing is substantially the same as that of the first embodiment and only the differences will be explained below.

Steps S1001, S1002, S1004 and S1005 in FIG. 10 are virtually the same as steps S401, S402, S404 and S405, respectively, in FIG. 4. Differences are due to the fact that, in this embodiment, a single normal RPT disable/enable command is used for disabling and for enabling the real-time processing as has been explained above. Thus, if the data obtained in step S1002 represent this RTP disable/enable command (step S1002; RTC disable/enable), the CPU 103 sets or resets an RT flag in the flag memory 114 for every real-time command (step S1003), and checks whether the processing should be continued or not (step A1005). If continued (step S1005; Yes), the procedure returns to the step S1001.

With the receive interrupt process and the normal processing as described above, when the host computer 120 intends to send to the printer a stream of data including a false real-time command as explained above, it first sends the RTP disable/enable command to disable the real-time command(s) involved, then sends the data stream and finally sends the RTP disable/enable command again to enable the real-time command(s) disabled before.

Host Computer

Figure 11:
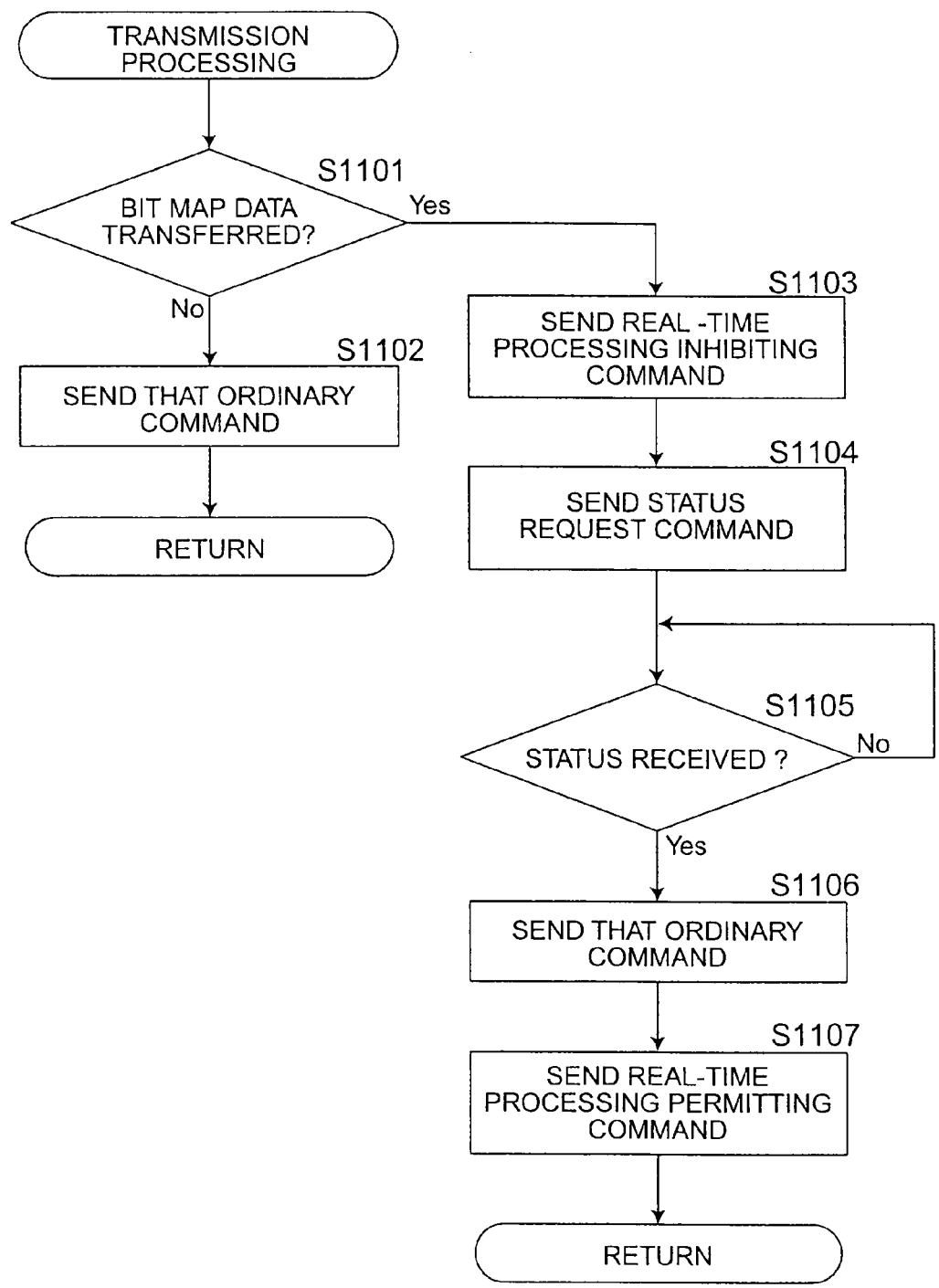
FIG. 11 is a flow chart showing a process implemented in the host computer.

The structure of the host computer of this embodiment of the invention is the same as that shown in FIG. 5 and described above. FIG. 11 is a flow chart of the process in the host computer 120 executed for sending to the printer a stream of data of a normal command such as an image print command or a font definition command. The process illustrated in FIG. 11 is similar to that of the first embodiment shown in FIG. 6. The differences will be explained below.

Steps S1101, S1102, S1103, S1106 and S1107 are the same as steps S601, S602, S603, S604 and S605, respectively, in FIG. 6, except that the commands sent in steps S1103/S1107 are different from the commands sent in steps S603/S605.

More particularly, in step S1103 the CPU 501 sends the RTP disable/enable command in a command disabling condition (step S1103). Subsequently, it sends, of the normal commands implemented in the printer 101, a status request command requesting the printer to return status information (step S1104). The CPU 501 waits for the status information to be returned by the printer 101 (step S1105), and after receiving the status information, it sends the data stream of that normal command (step S1106), and finally sends the RTP disable/enable command in an enabling condition (step S1107). This process is then terminated.

The reason why the status request command is sent in step S1104 and the procedure then waits for the status information in step S1105 is as follows.

There is a possibility of the occurrence of a time difference from when the printer 101 receives an RTP disable/enable command until this command is executed and the RT flags in the printer's flag memory are set correspondingly. For example, if an RTP disable/enable command for disabling a particular real-time command is sent and a data stream accidentally including the corresponding false real-time command is sent immediately after the RTP disable/enable command, the command to be disabled may in fact be executed. Therefore, the printer 101 has a function whereby its own status including the RT flags is stored in a memory as status information and is sent in response to a status request command from the host computer. Hence, through the use of this function, it is possible to verify whether the instructed setting of the RT flags is carried out or not.

As explained before, when the printer 101 receives the RTP disable/enable command, it updates the RT flags in the flag memory 114 as well as in the status information memory 116. In step S1104, execution of that processing is reported to the host computer in a manner such that status information including these flags is sent in response to the status request command from the host computer. Thus, it is possible to positively confirm that the RTP disable/enable command has been executed. The command requesting the status of the RT flags can be a dedicated command, but can also be a general-purpose command to be sent together with other status data depending on the contents of the status data.

In addition, in this embodiment, since the RT flags can be set independently for each real-time command, if a command which is not carried out in the middle of the normal processing, such as the command for turning off the power supply to the printer, is normally disabled and enabled immediately before it is needed (before the power supply is to be turned off), it is possible to simplify the process in the host computer of checking whether or not false real-time commands are included in the data stream of a normal command to be sent to the printer.

Fourth Embodiment

Receive Interrupt Process in Printer

Figure 12:
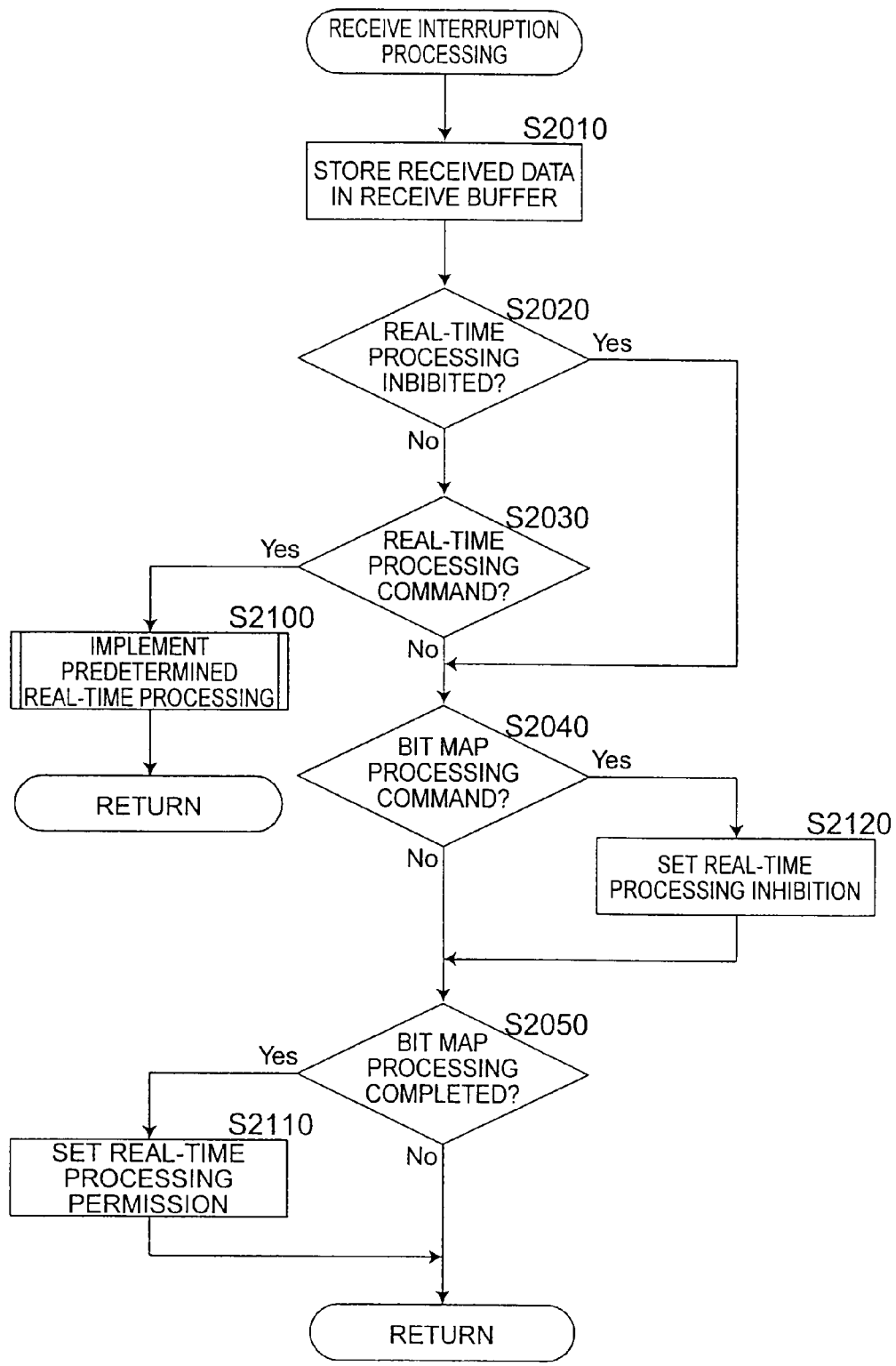
FIG. 12 is a flow chart of a receive interrupt process in a printer according to a fourth embodiment of the invention.

FIG. 12 is a flow chart of the receive interrupt process in a printer according to a fourth embodiment of this invention. In this embodiment, as well as the first embodiment shown in FIG. 2, the interrupt process starts when the interface 102 (see FIG. 1) of the printer 101 receives a byte from the host computer 120, and the same or corresponding portions will be omitted from the following description. In addition, as with the embodiment shown in FIG. 2, this embodiment employs the normal commands defined as 1) to 3) in the description of the first embodiment and actually processes them as RTP disable commands.

Upon the start of the interrupt process, the CPU 103 puts the byte received by the interface 102, into the receive buffer 111 (step S2010).

Following this, the CPU 103 checks the flag memory 114 to decide whether or not the real-time processing is currently disabled (step S2020). If no image data command has been received so far, the RT flag indicating whether the real-time processing is enabled or disabled is in an initial condition, i.e., it is set, which means real-time processing is enabled.

If the real-time processing is not disabled (step S2020; No), an analysis is made as to whether or not the received byte is the last one to complete a real-time command (step S2030). If it is, a predetermined real-time processing in accordance with the real-time command is executed (step S2100), and then this process comes to an end. If real-time processing is disabled, the procedure skips this real-time processing.

Furthermore, if the answer in step S2030 is No, i.e., the received byte does not complete a real-time command, an analysis is made as to whether or not an image data command has bee received (step S2040). If the decision of this step indicates that an image data command has been received (step S2040; Yes), the RT flag in the flag memory 114 is cleared (step S2120).

Subsequently, an analysis is made on whether the image data processing has been completed or not (step S2050). If completed, the RT flag in flag memory 114 is set and the real-time processing enabled (step S2110). Because a command parameter indicative of the length of command data precedes the image data command, this analysis is accomplished by checking the data length on the basis of this command parameter.

The above-mentioned processing can cope with the case of accepting and processing a real-time command and the case of disabling this command for preventing malfunctions in the image data processing, without conflicting with each other.

Figure 13:
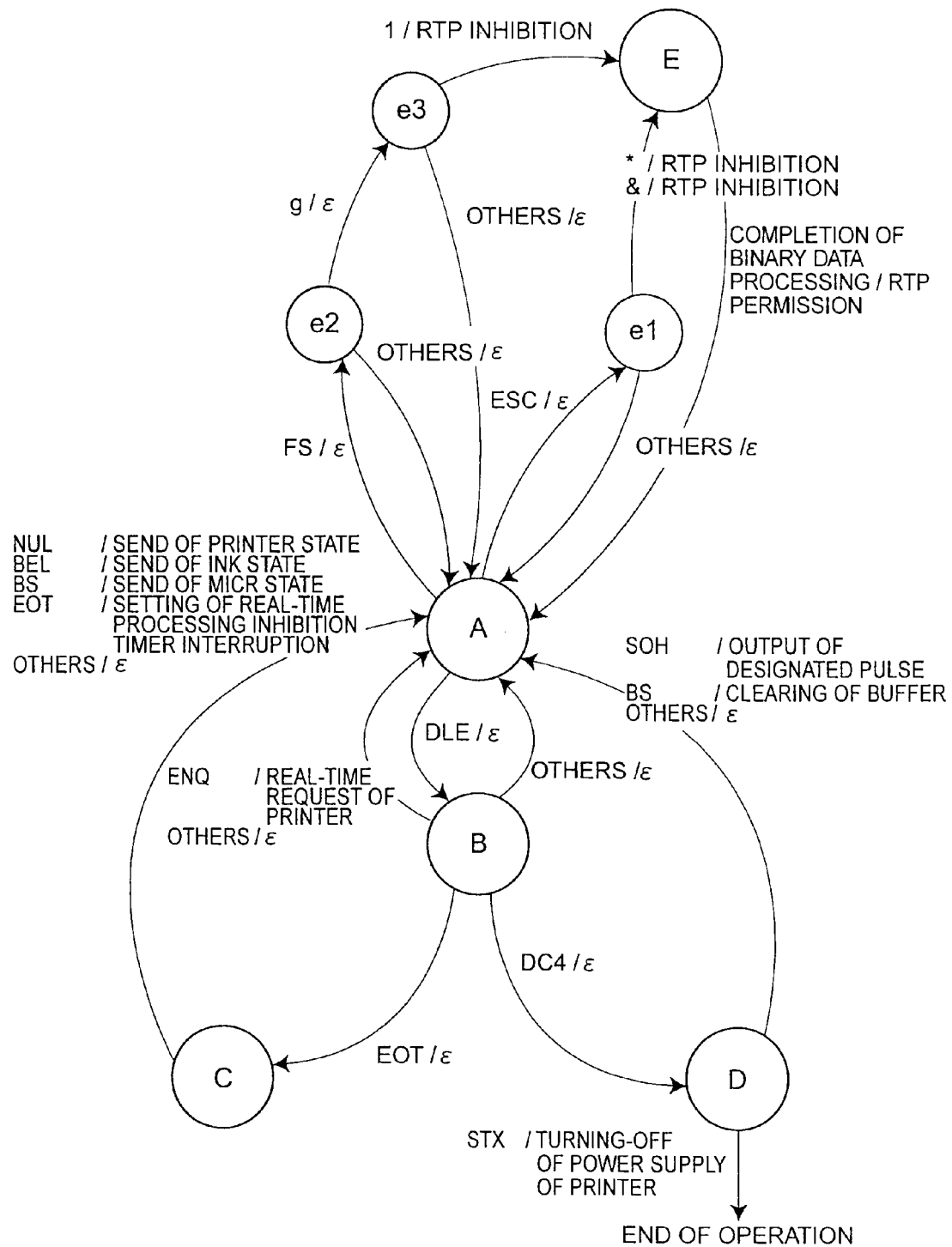
FIG. 13 is an explanatory illustration of state transitions of the receive interrupt process in FIG. 12.

FIG. 13 is an explanatory illustration of a state transition diagram in the receive interrupt process of FIG. 12. States B, C and D and the conditions of transitions between states, that is, the conditions for the transitions A-B, B-C, C-A, B-D, and D-A, are similar to those explained in the context of FIG. 3, and the description thereof will be omitted for brevity.

A state e1 signifies the first byte (ESC) of an image data command ESC* or ESC & is being received currently. In the state A, if the value of the received byte is ESC, shifting to the state e1 takes place. Furthermore, in the state e1, if the value of the next received byte is * or &, shifting to a state E, which will be described later, takes place. In the case other than this, shifting to state A takes place.

A state e2 signifies that the first byte (FS) of the image data command FSg1 m is currently being received. In state A, if the received byte corresponds to FS, shifting to the state e2 takes place.

A state e3 signifies that the second byte (g) of the command FSg1 m is being received. In state e2, if the received byte is g, shifting to state e3 takes place. In a case other than this, shifting to state A takes place. Furthermore, in state e3, if the value of the next received byte is 1, shifting to state E takes place. In a case other than this, shifting to state A takes place.

The state E signifies that any of the image data commands ESC*, ESC &, and FSg1 m is currently being processed. In this state, the RT flag in the flag memory 114 is cleared.

In the image data commands ESC*, ESC &, FSg1 m, since a command parameter defines the data length of the image data to follow, after shifting from state e1 or e3 to state E, the data stream indicative of the image data length, sent with ESC*, ESC &, and FSg1 m, is received subsequently. In state E, the received value is set in the counter 115, and subsequently decremented by 1 with every byte received.

When the count value of counter 115 reaches zero, that is, at the completion of the reception of the image data, the RT flag in the flag memory 114 is set, and the shifting from the state E to the state A takes place.

As described above, in this embodiment, when the printer 101 receives an image data command, real-time commands are automatically disabled, and when the last byte of the image data command is received, the real-time commands are enabled again; hence, it is not necessary to provide an extra command for disabling/enabling real-time commands.

On the other hand, in the host computer 120, even if a false real-time command is included in the data stream of an image data command, there is no need to take any action like sending an RTP disable/enable command in advance, which allows the image data to be sent more easily to the printer.

Normal Processing in Printer

Figure 14:
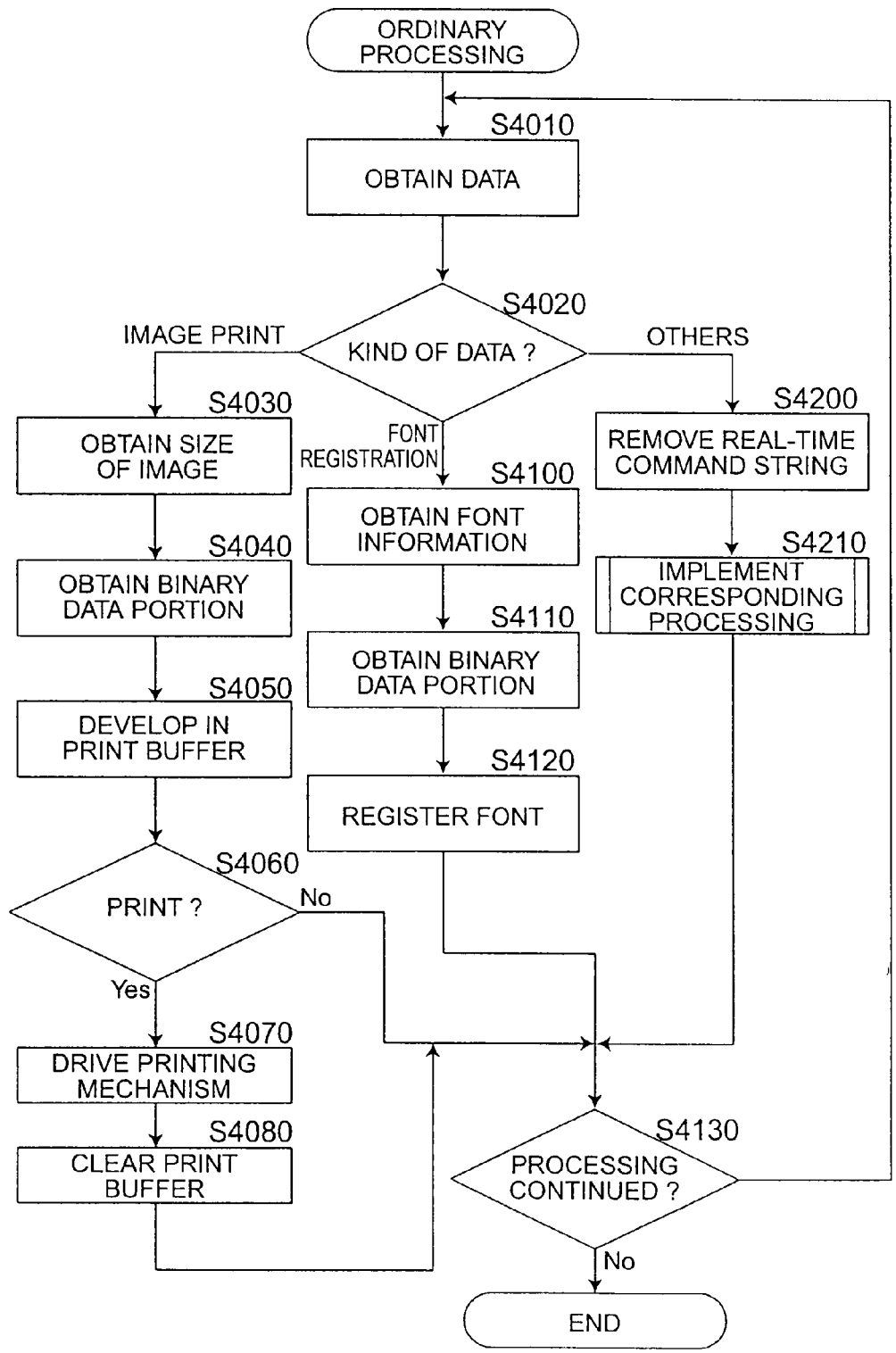
FIG. 14 is a flow chart showing a normal processing in the printer corresponding to the interrupt process in FIG. 12.

The normal processing is for interpreting and printing the data the printer 101 receives. FIG. 14 is a flow chart of such normal processing. As will be understood by those skilled in the art, this normal processing can be interrupted any time by the interrupt process of FIG. 12 in response to a receive interrupt.

Incidentally, as long as unprocessed data remain in the receive buffer 111, the CPU 103 obtains and processes that data, while, when no data remain, it waits until new data is written into the receive buffer 111 through the foregoing interrupt process. In this way, a quasi-multitasking processing is implemented. In the following description, for simplicity, the process for retrieving one byte from the receive buffer 111 and the repeated processes for retrieving multiple bytes from the receive buffer 111 will together be referred to as "obtaining" data from the receive buffer. In addition, in this embodiment, a command for enabling the real-time processing is implemented as a normal command.

First of all, the CPU 103 obtains data from the receive buffer 111 (step S4010), and checks that data (step S4020). If the data represents a normal command other than an image data command (step S4020; others), the processing corresponding to that command is executed (step S4210). If real-time command data stream is detected, it is skipped (Step S4200) since it has already been implemented in interrupt process (Step S2100). This processing includes, for example, printing of text or graphics, printing of images, registration of the font data of a font definition command, and storage of predetermined data in the nonvolatile memory 106. Then, if there is subsequent data (step S4130; Yes), the procedure returns to the step S4010.

If the answer in step S4020 shows printing of images, after obtaining the command parameter indicating the length of the data stream (step S4030), the CPU 103 obtains the subsequent image data (step S4040) to develop them in the print buffer 112 (step S4050). Additionally, the CPU 103 confirms that the printing has not been canceled (step S4060). If the answer in S4060 is "Yes", the CPU 103 drives the printing mechanism 107 to carry out the printing (step S4070), and clears the print buffer after printing is completed.

Furthermore, if the decision of the step S4020 indicates a font definition command, the CPU 103 obtains font description data (step S4100), and obtains the subsequent font data representing the user-defined font or characters (step S4110) and registers this data in a predetermined memory area (step S4120). Upon the completion of the respective processing, the CPU 103 confirms whether further data exists or not (step S4130). If not, the CPU 103 terminates this processing, otherwise the procedure returns to the step S4010 for continuing this processing.

When the receive interrupt process and the normal processing are performed in this way, and the host computer intends to send to the printer a data stream of a normal command (for example, an image print command or a font definition command) which can include, as part of a command parameter and command data stream, a false real-time command, it deals with such a command as if it had an RTP disable command function, the printer enable RTP command at the end of the command data of the normal command. Accordingly, it becomes possible to prevent the real-time processing from being executed due to a false real-time command accidentally included in the normal command.

In all the above-described embodiments, the receiving/analyzing processing for receiving data, the real-time processing for carrying out real-time commands, the normal processing for carrying out normal commands, and the setting processing for setting flags are implemented in a control circuit of the printer preferably including a CPU, a RAM, and a ROM storing programs for operating the CPU, where a receive processing section, a real-time processing section, a normal processing section, and an indication section, are constructed with sets of programs and hardware. A portion of or all of each of these processing sections is also replaceable with gate arrays or hardware such as a DSP.

Although the programs of these processing sections are commonly stored in a ROM, it is also possible that they are stored on a magnetic storage medium such as CD-ROM, an optical disk medium, and a web site, and are set in the printer from such medium.

As described above, according to this invention, the following effects are obtainable.

First, it is possible to provide a printer and an information processing apparatus capable of performing processing in a state of distinguishing a false real-time command among image data from a true a real-time command.

Particularly, it is possible to provide a printer, an information processing apparatus and a control method therefor, capable of, even if there is a normal command data stream which can include the same byte pattern as a real-time command, performing correct processing without the need for the user to pay attention to this.

Since, in an embodiment of the invention, the disabling and enabling of the real-time processing can be set individually for each a plurality of implemented real-time commands, high-priority command processing such as a status request becomes practicable at all times, and it is possible to surely perform the printing processing without impairing the functions of the information processing apparatus side.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An imaging device adapted to receive from a host device image data and commands including a normal command, an image data command associated with a parameter indicative of a data length of the image data to be processed, and a real-time command to be processed prior to the normal command, the imaging device comprising:
   a receiver configured to receive the image data command and subsequently the parameter from the host device; and
   a processor configured to process the parameter without processing the real-time command, even if a data sequence identical to a byte stream of the real-time command is included in the image data, after processing the image data command.

2. The imaging device of claim 1, wherein the processor is further configured to process the real-time command received from the host device, after processing the image data command and the parameter.

3. A method of controlling an imaging device adapted to receive from a host device image data and commands including a normal command, an image data command associated with a parameter indicative of a data length of the image to be processed, and a real-time command to be processed prior to the normal command, the method comprising:
   (a) receiving the image data command and subsequently the parameter from the host device;
   (b) after step (a), processing the image data command; and
   (c) after step (b), processing the parameter without processing the real-time command, even if a data sequence identical to a byte stream of the real-time command is included in the image data.

4. The method of claim 3, further comprising:
   (d) after step (c), processing the real-time command from the host device.

* * * * *